United States Patent

Edwards

[11] 3,955,842
[45] May 11, 1976

[54] LOCKING DEVICE

[75] Inventor: Shirley Edwards, Hawkhurst, England

[73] Assignee: Envopak Limited, England

[22] Filed: Dec. 5, 1973

[21] Appl. No.: 421,930

[30] Foreign Application Priority Data
Dec. 13, 1972   United Kingdom............. 57390/72

[52] U.S. Cl........................................... 292/307 R
[51] Int. Cl.²....................................... B65D 33/34
[58] Field of Search................... 292/307, 320, 318; 24/205.11

[56] References Cited
UNITED STATES PATENTS

| | | | |
|---|---|---|---|
| 654,418 | 7/1900 | Simon | 292/307 R |
| 1,487,885 | 3/1924 | Raphael | 292/307 R |
| 1,908,241 | 5/1933 | Heeren et al. | 292/327 |
| 1,976,089 | 10/1934 | Peake | 292/318 |
| 2,557,565 | 6/1951 | Rifkin | 292/327 |
| 3,149,869 | 9/1964 | Chamberlin | 292/320 |
| 3,768,849 | 10/1973 | Sytko | 292/327 |

*Primary Examiner*—Richard E. Moore
*Attorney, Agent, or Firm*—Wenderoth, Lind & Ponack

[57] ABSTRACT

A locking device for security sealing purposes and of the kind comprising an enclosure element intended to be permanently fixed to an article which is to be locked and a disposable element which is engageable into the enclosure element to close the device and disengageable from the enclosure element by rupture to open the device. The device is characterized in that the disposable element has a plug part which is resiliently deformable so as to be slidably insertable, but not retractable, through an entrance to the enclosure element and which is connected to a head part which projects outwardly of the enclosure element so as to be manually manipulable to detach it from the plug part and thereby open the device.

12 Claims, 5 Drawing Figures

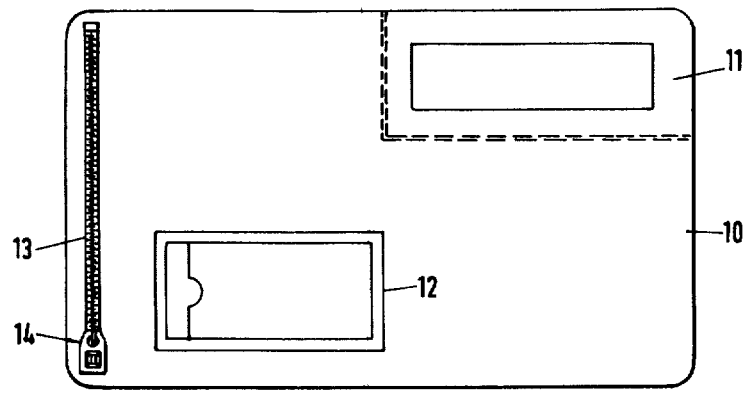
FIG. 1.
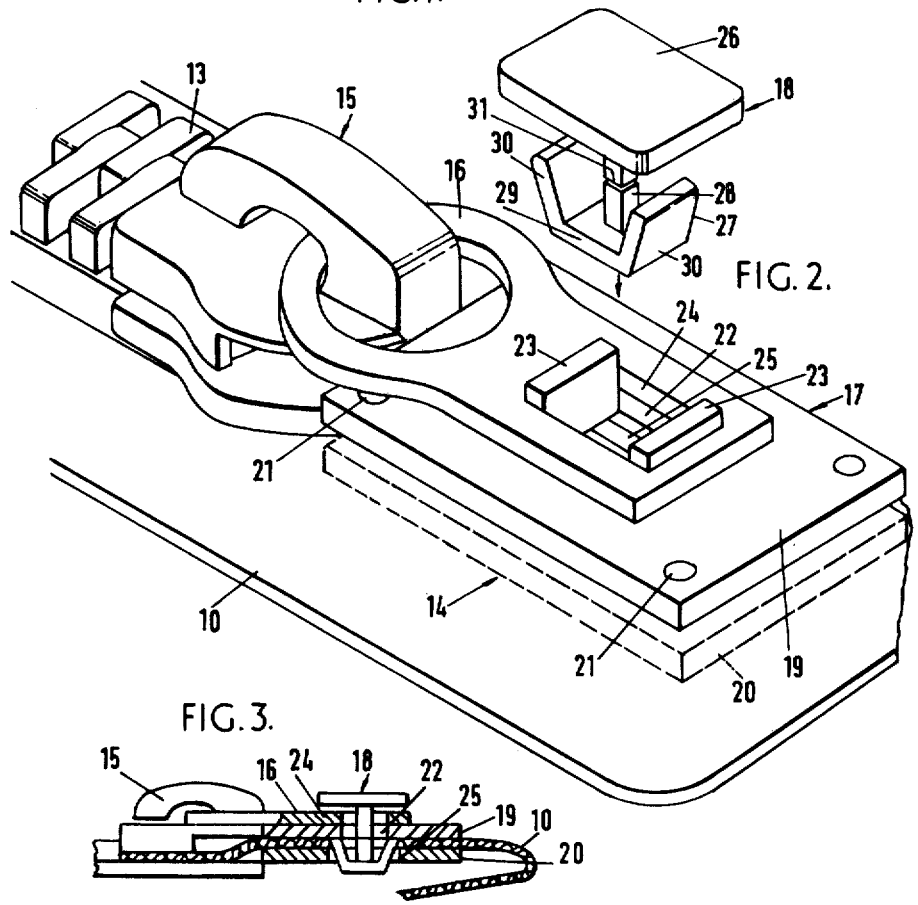
FIG. 2.
FIG. 3.

LOCKING DEVICE

BACKGROUND OF THE INVENTION

This invention relates to locking devices of the kind comprising an enclosure element permanently fixed to an article which is to be locked and a disposable element which is engageable into the enclosure element to lock the device and disengageable from the enclosure element to unlock the device, by force applied to the locking device, the disposable element being broken, deformed or otherwise damaged during disengagemnt so as not to be re-usable.

Such locking devices are commonly used amongst other purposes for the security sealing of envelopes, packages and so forth to prevent, discourage or indicate unauthorized interference with the contents thereof.

Locking devices of the above kind generally necessitate the use of a tool to disengage the disposable element and thereby open the device and the present invention aims to provide a locking device in which no tool is required to unlock it, the only force required being a manual force provided, for example, by the fingers acting directly on the locking device.

SUMMARY OF THE INVENTION

In accordance with the present invention, a locking device of the kind referred to is characterized in that the disposable element has a plug part which is resiliently deformable so that for locking purposes it is slidably insertable but not retractable through an entrance to the enclosure element while attached by a rupturable portion to a head part which when the device is locked is outside the enclosure element and accessible for manual manipulation to detach the head part from the plug part so as thereby to unlock the locking device and permit removal of the plug part from the enclosure element whereafter the latter can be re-used with a fresh disposable element.

Preferably the plug part is convergent towards its leading end and conveniently the plug part is flat and of arrow-head or other barbed conformation for insertion through a rectangular opening in the enclosure element. Also the head part of the device may extend either in the same plane as the stem and the plug or alternatively in a plane which is oblique or substantially perpendicular thereto. Preferably the stem part is weakened to facilitate bending and breakage and thereby reduce the amount of force and leverage required to separate the head part from the plug part.

The invention also provides an envelope of the so-called reusable type having an open end closed by a fastener, the fastener being held closed by a locking device of the invention. Although it is possible for the enclosure element of the device to be separate from the envelope, in a preferred embodiment we mount the enclosure element on the envelope. The fastener may be a zip fastener and the locking device may be used to retain the tab of the zip fastener.

BRIEF DESCRIPTION OF THE DRAWING

An envelope incorporating a locking device providing a first preferred embodiment of the invention will now be described by way of example only and with reference to FIGS. 1 to 3 of the attached drawings a second embodiment being shown in FIGS. 4 and 5. In these drawings:

FIG. 1 shows a front view of the envelope, including a locking device,

FIG. 2 shows a perspective view of the locking device of FIG. 1 before being locked and, FIG. 3 is a cross-sectional through the locking device of FIG. 2 when in the locked position.

DETAILED DESCRIPTION OF THE INVENTION

Figure 4:
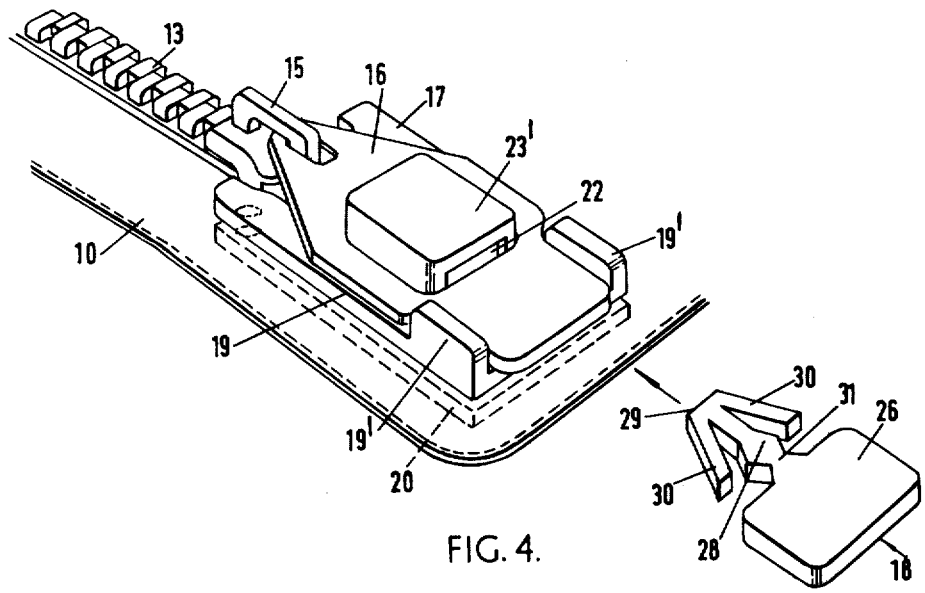
FIG. 4, analagous to FIG. 2, is a perspective view of a second embodiment of locking device in use with a zip fastener slide.

Referring firstly to FIG. 1 there is illustrated a so-called re-usable envelope 10. Such envelopes are used, for example, between two branches of a business in which letters are continually passed back and forth, the envelope being re-used merely by changing the address and stamps and after a short time, the economies affected by not using a new envelope each time will pay for the extra cost of the re-usable envelope.

The envelope 10 is of a plastics material and includes an open window 11 behind which the necessary stamps may be mounted. In the present embodiment the stamps can be inserted from a slit along the top side of the envelope. The backing member of the window is adhered to the inside of the envelope. There is also provided an address window 12 behind which may be mounted the address to which the envelope is to go. The address may be mounted on a card behind the address window 12 and may be changed. One end of the envelope is closed by a sealing means in the form of a zip fastener 13 which extends across the entire width of one end. A locking device 14 is provided in order to lock the zip 13 closed and render secure the documents within the envelope during transit.

The envelope could alternatively be formed with an increased width portion at one end into which the ends of the zip fastener would extend. The main part of the locking device would then be fixed on an extended width portion of the envelope.

The locking device is shown in more detail in FIGS. 2 and 3. As can be seen from FIG. 2 the closing mechanism 15 of the zip 13 includes the usual tab 16. The locking device 14 comprises an enclosure element 17 and a disposable part 18 each preferably made of synthetic plastics material. The enclosure element 17 comprises two plates, namely an upper plate 19 mounted on the front surface of the envelope 10 and a lower plate 20 mounted on the back surface of the envelope 10. The lower plate 20 and upper plate 19 are connected together by spigots 21 which pass through the material of the envelope to rigidly secure the two plates to the envelope adjacent the end of the zip 13.

The upper plate 19 includes a rectangular aperture 22 which registers with a similar shaped aperture in the material of the envelope 10. The upper plate 19 includes two upstanding portions 23 extending along opposite transverse edges of the rectangular aperture 22. As can be seen from FIG. 2 the tab 16 includes a rectangular aperture 24 of the same width as rectangular aperture 22 but slightly longer so that the tab can lay on the upper face of the upper plate 19 with its rectangular aperture 24 engaging over the upstanding portions 23 of the plate 19, the rectangular aperture 24 of the tab 16 registering with the rectangular aperture 22 of the plate 19.

As can be seen, the lower plate 20 also includes a rectangular aperture 25 which registers with the rectangular apertures 22 and 24. The rectangular aperture 25 is of the same width as the other two rectangular apertures 22 and 24 but is longer than either, as can be seen from FIG. 3 which shows a longitudinal section.

The disposable member 18 of the locking device 14 comprises a head part 26, a plug part 27, and a stem part 28. The head part 26 comprises a rectangular plate from the centre of the lower face of which the stem 28 extends, the lower end of the stem 28 joining the plug part 27. The plug part 27 is of arrow head form and comprises a base plate 29 opposite edges of which include upstanding portions 30 which are canted outwardly from one another. As can be seen clearly from FIG. 3, from a side view, the tail part 27 has a truncated V-section. As can be seen from FIG. 2, the stem portion 28 includes a weakened section 31 comprising an annular slot around the stem.

The dimensions of the plug part 27 of the disposable element 18 are important. The width of the base plate 29 (i.e., the distance between those edges not carrying upstanding parts 30) is slightly less than the width of the rectangular aperture 25 so as to be a snug fit therewith. The distance between the uppermost edges of the upstanding parts 30 is greater than the longitudinal length of the rectangular apertures 22 and 24 but less than the longitudinal length of the rectangular aperture 25. The distance between the edges of the base plate 29 carrying the upstanding parts 30 is less than the longitudinal length of any of the rectangular apertures 22, 24 and 25. The element 18 is manufactured of a material such as a synthetic plastics materials which is slightly resilient so that the upstanding parts 30 of the plug part 27 can flex inwardly towards one another. The outer plate 19 and inner plate 20 may simply be made of synthetic plastics material.

In the use of the envelope the end of the envelope may be closed by moving the closing mechanism 15 of the zip to the end adjacent the locking device 14 during transit. In order to lock the closing mechanism 15 in this closed position during mailing the tab 16 is engaged with the upstanding portions 23 as shown in FIG. 2.

The disposable element 18 may then be lowered in the disposition shown in FIG. 2 so that the plug part 27 of the element 18 moves into engagement with the rectangular apertures 22, 24 and 25. The upstanding parts 30 of the plug part 27 engage the upstanding portion 23 and as the disposable element is forced into the apertures, the upstanding parts 30 flex towards one another. The disposable element passes downwardly under finger pressure applied to the head part 26 until the top edges of the upstanding parts 30 have passed through the rectangular apertures 22 and 24. They then spring outwardly away from one another since the longitudinal length of the aperture 25 is greater than the width between the upstanding parts 30 in their natural position and engage with the underside of the outer plate 19. This is clearly shown in FIG. 3. At this time the head part 26 of the disposable element 18 rests on the upstanding portions 23. It is not now possible to remove the element 18 upwardly by pulling since the upstanding parts 30 are engaging the underneath of the outer plate 19 and will prevent it. It is not possible for the plug part 27 to rotate about the axis of the stem nor to move sideways since the width of the base plate 29 is the same as the width of the aperture 25. In view of the fact that the head part 26 is larger than the aperture 24 in the tab 16, the tab 16 is locked and cannot be removed.

When the envelope reaches its destination the locking device may easily be opened. This is accomplished by applying manual or finger pressure to the head part 26 to rotate it about the axis of the stem 28. By virtue of the weakened part 31 of the stem 28, it is not very resistant to rotation although the stem 28 is quite strong in the axial direction. Thus the head part 26 can be rotated readily whilst the plug part 27 of the element is prevented from rotation by the sides of the aperture 25 engaging with the sides of the upstanding parts 30. The stem 28 breaks and this allows the head part 26 to be removed and hence the tab 16 lifted to undo the zip 13. The degree of manual force required to break the stem 28 can be chosen by varying the dimensions of the head part 26 always supposing that the head part 26 is larger than the aperture through the tab 16. The rectangular shape of the head part 26 assists in gripping the head part 26 and turning it.

When the envelope is to be used again, the address in the address window 12 can be changed, new stamps can be inserted in the stamp window 11, the zip 13 closed and the tab 16 reengaged with the upstanding portions 23. A new disposable element has to be used and upon entrance of the plug part of the new element into the enclosed part 17, the plug part 27 of the preceeding element is ejected into the interior of the envelope if it has not already fallen out.

Features which should be noted are that by virtue of having the lower plate 20 and plug part 27 of the element within the envelope they cannot be tampered with whilst the envelope is in transit. Further, it is not possible to undo the zip by unlocking the locking device whilst the envelope is in transit and then doing it up again since the disposable element 18 has to be removed and can only be removed by breaking it. To safeguard the fastening still further, the end of the plates 19 and 20 nearest the closing mechanism 15 could be extended so as to mask the recessed end part of the latter when it is in the fully closing position. By virtue of arranging the locking device to be unlocked by means of manual pressure, the necessity for a separate tool is overcome which is very useful in the practical applications of the envelope.

It is to be understood however that although the disposable element is specifically designed so that it is manually breakable for purposes of removal without the need for employment of a special tool, nevertheless the removal of disposable elements in quantity may cause blistering or undue fatigue of the operator's fingers. There may thus be provided with the device a special tool, having for instance the form of a spanner, for removing quantities of disposable elements. The head of the disposable element may accordingly be slotted or otherwise recessed or externally shaped to facilitate engagement of such a special tool.

Figure 5:
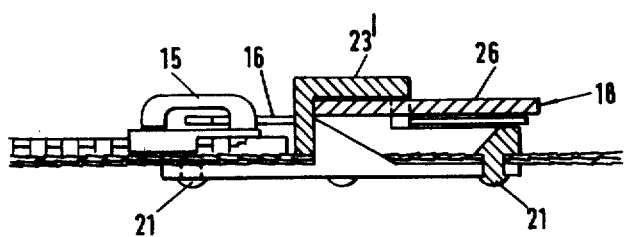
FIG. 5 is a central longitudinal section through the locking device shown in FIG. 4.

An alternative, and in some respects improved, embodiment of the invention is illustrated in FIGS. 4 and 5 to which reference is hereinafter made. This embodiment operates in the same principle as the embodiment of FIGS. 1 to 3 inclusive and parts common to both embodiments are in general designated by the same reference numerals.

The main difference between the embodiment of FIGS. 1 to 3 and that of FIGS. 4 and 5 is that in the latter the disposable element 18 is flat, with the plug part 29, the stem part 28 and the head part 26 all in the same plane, whilst the enclosure element has the form of a raised housing 23' with a side entrance 22 for receiving the plug part 29. Further, the fastener tab 16 not only has a rectangular opening 24 for accommodating the housing 23' but also has a free end part of reduced width which is located between lugs 19' at each side edge of the housing plate 19. The entrance 22 is a rectangular slot of the same width as the inside of the housing 23' except at the top — that is to say the part above the level of the top of the fastener tab 16 when the latter rests, as shown, on the plate 19.

The plug part 29 is of flat substantially arrowhead profile with barbs 30 and extends from a stem part 28 which has a waisted reduced width and thereby weakened, section 31. A weakened section could alternatively be created by means such as for instance a through hole or a circular depression in the stem.

The thickness and width of the plug part 29 is important in that it must fit snugly into that part of the entrance 22 which is exposed above the tab 16 when the latter is in an engaged position. The maximum width of the plug part measured across the extremities of the barbs exceeds the exposed width of the entrance 22 but is less than the width of the interior of the housing 23'.

Similarly the minimum resiliently deformed width between the barbs is correspondingly less than the exposed width of the entrance 22.

The disposable element 18 is made of a resilient material — for example a synthetic plastics material — whereas the enclosure element parts 19, 19', and 23 are made of a strong rigid material.

In order to lock the locking device, the tab 16 is brought into the position shown in FIG. 4 whereafter the disposable element 18 is moved in the direction indicated by the arrow so that the plug part 29 is slidably inserted into the entrance 22 causing inward deflection and subsequent return movement of the barbs 30 so that the latter engage behind the inside surface of the housing adjacent the ends of the entrance 22 so as effectively to lock the enclosure part and the disposable part of the locking device together with the tab retained therebetween.

In order to release the locking device, the head part 26 of the disposable element 18 is manually levered in an upward direction whereupon it bends naturally at its waisted section and as bending proceeds will fracture into two separate pieces respectively comprised of the head part 26 and the plug part 29.

This now permits the tab 16 to be lifted and released from its engaged position from the housing, the plug part 29 having fallen freely within the housing 23' so that it is easily withdrawable through the full width part of the entrance 22.

The locking devices illustrated have a number of uses not restricted to the envelope shown. Thus the locking device may be used to lock any zip fastener such as might be used on mail bags and other sacks and containers and might also be used to seal other containers such as milk churns and medicine bottles. It might also be used for sealing electricity meters and gas meters. The head parts of the disposable elements may be embossed with a pattern for identification and replacement of the original plug by another by an unauthorised user.

Further, the suitability of at least the disposable element of the device for manufacture from synthetic plastic material enables the device to be more economically produced than has hitherto been possible with traditional locking device made of material.

I claim:
1. A locking device for positively locking a closure member of an article to be locked in an article closing position, said locking device comprising:
    a base member permanently securable to an article to be locked and including means for aligning a closure member of said article in an article closing position with said closure member overlapping said base member;
    said closure member having therein receiving means for receipt therein of said aligning means when said closure member is in said article closing position and overlapping said base member;
    said aligning means having therein entrance means for receiving a portion of a disposable locking element to prevent disengagement of said closure element from said aligning means;
    means for permanently securing said base member to said article; and
    a disposable locking element completely separate from said base member and made of synthetic plastics material, said locking element including:
    a resiliently deformable plug part of substantially arrow-head configuration which is resiliently yieldable and slidably insertable through, but not slidably retractable from, said entrance means of said aligning means; and
    a head part connected to said plug part by a rupturable portion, said head part, when said plug part is inserted through said entrance means into a locking position, being outside said aligning means and covering a portion of said closure member, thereby forming means for preventing disengagement of said closure member from said aligning means, said head part having accessible manual manipulation means for allowing said head part to be rupturably removed from said plug part after said plug part is in said locking position, to thereby allow said closure member to be disengaged from said aligning means and the thus separate plug part to be removed, whereafter said base member and said aligning means can be re-used with a fresh disposable locking element to relock said closure member when desired.

2. A device as claimed in claim 1, wherein said article is an envelope, and said article closure member is attached to the clasp of a sliding clasp fastener by which the envelope is opened and closed.

3. A device as claimed in claim 1, wherein said article closure member is flat and said receiving means comprises an aperture, said aligning means extending through said aperture.

4. A device as claimed in claim 1, wherein said article closure member and said disposable locking element head part are both flat and in parallel juxtaposition when said disposable element is in said locking position.

5. A device as claimed in claim 1, wherein said head part is disposed in a plane perpendicular to the axis of said plug part.

6. A device as claimed in claim 1, wherein said head part and said plug part are in the same plane.

7. A device as claimed in claim 1, wherein said receiving means comprises an aperture through said closure member, and said aligning means comprises a pair of upstanding members which align said closure member by fitting through said aperture.

8. A device as claimed in claim 1, wherein said closure member is flat, and said plug part of said disposable locking element is insertable along an axis perpendicular to the plane of said closure member to an operative position in which said plug part passes through said closure member.

9. A device as claimed in claim 1, wherein said closure member is flat, and said aligning means is formed as a housing with said entrance means in one side thereof, said receiving means comprising an opening through said closure member, said housing extending through said opening when said closure member is in said artical closing position.

10. A device as claimed in claim 9, wherein said base member has a duct extending from the bottom of said housing to permit escape of the plug part outwardly past the said entrance means after rupture of the head part from the plug part.

11. A device as claimed in claim 1, wherein said base member has therein opening means for permitting escape of the plug part after rupture of the head part from the plug part.

12. A device as claimed in claim 1, wherein said arrow-head configuration of said plug part is formed of a pair of oppositely divergent projections.

* * * * *